United States Patent
Tsai et al.

(10) Patent No.: US 8,629,856 B2
(45) Date of Patent: *Jan. 14, 2014

(54) APPARATUS AND METHOD FOR ACQUIRING OBJECT IMAGE OF A POINTER

(71) Applicant: PixArt Imaging Inc., Hsinchu (TW)

(72) Inventors: Cheng-Nan Tsai, Hsinchu (TW); Tzung-Min Su, Hsinchu (TW); Chih-Hsin Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/865,275

(22) Filed: Apr. 18, 2013

(65) Prior Publication Data

US 2013/0229388 A1 Sep. 5, 2013

Related U.S. Application Data

(63) Continuation of application No. 12/979,098, filed on Dec. 27, 2010, now Pat. No. 8,451,253.

(30) Foreign Application Priority Data

Jun. 14, 2010 (TW) ................................ 99119344 A

(51) Int. Cl.
*G06F 3/042* (2006.01)
(52) U.S. Cl.
USPC .......................... 345/175; 345/173; 178/18.09
(58) Field of Classification Search
USPC ..................... 345/173–178; 178/18.09, 18.11; 382/103, 168, 170, 171, 172, 188, 189, 382/203, 224, 225
See application file for complete search history.

(56) References Cited

U.S. PATENT DOCUMENTS

| | | | |
|---|---|---|---|
| 8,085,251 B2 | 12/2011 | Harada et al. | |
| 2006/0170658 A1 | 8/2006 | Nakamura et al. | |
| 2007/0109239 A1 | 5/2007 | den Boer et al. | |
| 2009/0123029 A1* | 5/2009 | Harada et al. | 382/103 |
| 2010/0053348 A1 | 3/2010 | Yoshimoto et al. | |
| 2010/0073327 A1 | 3/2010 | Mau et al. | |
| 2010/0117990 A1 | 5/2010 | Yahata | |
| 2010/0134444 A1 | 6/2010 | Yahata | |
| 2010/0225617 A1 | 9/2010 | Yoshimoto et al. | |
| 2010/0225618 A1 | 9/2010 | Yamashita et al. | |
| 2011/0050644 A1 | 3/2011 | Su et al. | |

FOREIGN PATENT DOCUMENTS

| | | |
|---|---|---|
| CN | 101430868 A | 5/2009 |
| CN | 101825462 A | 9/2010 |
| JP | 2008276325 A | 11/2008 |

* cited by examiner

*Primary Examiner* — Dmitriy Bolotin
(74) *Attorney, Agent, or Firm* — WPAT, PC; Justin King

(57) ABSTRACT

An apparatus and a method for acquiring object image of a pointer are provided. The apparatus is suitable for an optical touch system and is used for acquiring an object image of a pointer when the pointer interacts with a touch surface of the optical touch system. The apparatus includes an image sensor and a processing circuit. The image sensor is used for acquiring an image of the touch surface. When the pointer approaches the touch surface, the processing circuit compares at least a part of the information of a sensed image with a threshold value, so as to determine a comparison range. Then, the processing circuit determines another threshold value according to the image information in the comparison range. Afterwards, the processing circuit compares the image information in the comparison range with the aforementioned another threshold value, so as to acquire an object image of the pointer.

16 Claims, 8 Drawing Sheets

APPARATUS AND METHOD FOR ACQUIRING OBJECT IMAGE OF A POINTER

This application is a continuation application of U.S. patent application Ser. No. 12/979,098, filed on Dec. 27, 2010, which claims the priority benefit of Taiwan application serial no. 099119344, filed on Jun. 14, 2010, the entire contents of which are hereby incorporated by reference.

BACKGROUND

1. Technical Field

The present invention generally relates to touch technologies and particularly to an apparatus and a method for acquiring an object image of a pointer.

2. Description of the Related Art

FIG. 1 is a perspective view of an optical touch system in prior art. Referring to FIG. 1, the optical touch system 100 includes an apparatus 101 for acquiring an object image of a pointer, a panel 104 and reflectors 112 through 116. The apparatus 101 includes a processing circuit 110 and image sensors 106 and 108. Both of the image sensors 106 and 108 are used for acquiring an image of a touch surface 118 of the panel 104. The processing circuit 110 is electrically coupled to the image sensors 106 and 108, so as to receive images sensed by the two image sensors 106 and 108. In this embodiment, the touch surface 118 is a quadrilateral area, which is preferably shaped in rectangle. The reflectors 112 through 116 are all used for reflecting light to the touch surface 118, and all of the reflectors do not form any mirror image of the touch surface 118. When a pointer 102 approaches the touch surface 118, the processing circuit 110 acquires a position of the pointer 102 according to the images sensed by the two image sensors 106 and 108.

FIG. 2 is a schematic view of the optical touch system 100 with single touch. In FIGS. 1 and 2, the objects of uniform labels represent the same element. As shown in FIG. 2, the image sensor 106 can sense the pointer 102 along the sensing path 202, and the image sensor 108 can sense the pointer 102 along the sensing path 204. Thus, as long as the processing circuit 110 can acquire a straight line equation of the sensing path 202 according to the image sensed by the image sensor 106 and can acquire a straight line equation of the sensing path 204 according to the image sensed by the image sensor 108, the processing circuit 110 can further calculate a crossing point of the sensing paths 202 and 204 and can further calculate the coordinates of the pointer 102 according to the crossing point.

Before calculating the coordinates of the pointer 102, the processing circuit 110 needs to acquire an imaging range of the pointer 102 in an image sensing window of the image sensor 106 from the image sensed by the image sensor 106 (detailed as follows). That is, the processing circuit 110 needs to acquire an object image of the pointer 102 from the image sensed by the image sensor 106, so as to further acquire the straight line equation of the sensing path 202. Meanwhile, the processing circuit 110 still needs to acquire an imaging range of the pointer 102 in an image sensing window of the image sensor 108 from the image sensed by the image sensor 108. That is, the processing circuit 110 needs to acquire an object image of the pointer 102 from the image sensed by the image sensor 108, so as to further acquire the straight line equation of the sensing path 204. Further explanation is given as follows.

Take an operation of the processing circuit 110 and the image sensor 106 as an example. Before the pointer 102 approaches the touch surface 118, the processing circuit 110 senses the touch surface 118 through the image sensor 106, so as to obtain an image without any image of the pointer 102 and to regard the obtained image as a background image. Afterwards, the processing circuit 110 acquires the brightness values of the N brightest pixels in each pixel column of the background image, and the processing circuit 110 calculates an average brightness value or a total brightness value of the N brightest pixels in each pixel column to obtain a brightness distribution profile, wherein N is a natural number. Since the brightness of the background is usually non-homogeneous, the brightness distribution profile is presented as a curve segment. FIG. 3 is an exemplary brightness distribution profile acquired from the background image, each dot of the curve segment shown in FIG. 3 represents a column pixel brightness value of the background image.

When the pointer 102 approaches the touch surface 118, the processing circuit 110 acquires an image containing an object image of the pointer 102 through the image sensor 106. FIG. 4 is a schematic view of an image sensed by the image sensor. In FIG. 4, label 400 represents an image sensing window of the image sensor 106. A white zone labeled by 402 is a bright zone with a higher brightness in the image, and the bright zone is formed by the light reflected by the reflectors 114 and 116. The bright zone 402 is the main sensing area. Label 404 represents a dark stripe formed by the pointer 102. That is so called the object image of the pointer 102.

When the object image containing an image of the pointer 102 is acquired, the processing circuit 110 regards the acquired image as a sensed image, and the processing circuit 110 further acquires a brightness distribution profile of the sensed image by the same way of acquiring the above brightness distribution profile. FIG. 5 shows the aforementioned another exemplary brightness distribution profile. In FIG. 5, a curve segment labeled by 502 represents the brightness distribution profile acquired from the sensed image, and each dot of the curve segment represents a column pixel brightness value of the sensed image. In FIG. 5, the range labeled by $W_1$ is a range with low brightness formed by the light shading of the pointer 102. The curve labeled by 504 represents a threshold value, and the threshold value 504 is acquired according to a predetermined percentage of the brightness distribution profile (as shown in FIG. 3) acquired from the background image.

Referring to FIG. 5, after the brightness distribution profile 502 is acquired, the processing circuit 110 compares the brightness distribution profile 502 and the threshold value 504, so as to determine a column pixel distribution range corresponding to the part (in the range labeled by $W_1$) whose brightness values are less than the threshold value 504 in the brightness distribution profile 502 and to regard the column pixel distribution range as an imaging range of the pointer 102 in the image sensing window 400 of the image sensor 106. In other words, the processing circuit 110 acquires the image information in the imaging range $W_1$ and regards the acquired image information as an object image of the pointer 102. Thus, the processing circuit 110 can further acquire the straight line equation of the sensing path 202 according to the imaging range $W_1$. For example, the processing circuit 110 can calculate a gravity of the imaging range $W_1$, so as to further acquire the straight line equation of the sensing path 202. Similarly, the operation of the processing circuit 110 and the image sensor 108 can be the same with the operation of the processing circuit 110 and the image sensor 106. Thus, the straight line equation of the sensing path 204 can also be acquired.

However, many problems appear when the optical touch system 100 is used in multi-touch mode. Take an operation of the processing circuit 110 and the image sensor 106 as an example. When two pointers 102 approach the touch surface 118, and the two pointers 102 are adjacent to each other, the processing circuit 110 can acquire a brightness distribution profile from the sensed image. FIG. 6 shows the said acquired brightness distribution profile. In FIG. 6, a curve segment labeled by 602 represents the brightness distribution profile acquired from the sensed image, and each dot of the curve segment represents a column pixel brightness value of the sensed image. In FIG. 6, the range labeled by $W_2$ is a range with low brightness formed by the light shading of the two pointers 102. The curve segment labeled by 504 represents a threshold value, and the threshold value 504 is acquired according to a predetermined percentage of the brightness distribution profile acquired from the background image.

It can be learned from FIG. 6 that the processing circuit 110 may regard the two pointers 102 as one pointer if the threshold value 504 is too high. Thus, the processing circuit 110 can not further calculate the coordinates of the two pointers 102.

BRIEF SUMMARY

The present invention relates to an apparatus for acquiring an object image of a pointer, which can correctly acquire the object image of each of a plurality of pointers.

The present invention provides an apparatus for acquiring object image of a pointer. The apparatus is suitable for an optical touch system, and it is used for acquiring an object image of a pointer when the pointer interacts with a touch surface of the optical touch system. The apparatus comprises an image sensor and a processing circuit. The image sensor is used for sensing an image of the touch surface. The processing circuit is electrically coupled to the image sensor. When the pointer approaches the touch surface, the processing circuit acquires an image information from a sensed image, and the processing circuit compares at least a part of the image information of the sensed image with a first threshold value, so as to determine a comparison range. The processing circuit further acquires a second threshold value according to the image information in the comparison range. And the processing circuit compares the image information in the comparison range with the second threshold value, so as to acquire an object image of the pointer.

In an embodiment of the aforementioned apparatus, the second threshold value is between the first threshold value and a lowest dot from a curve segment corresponding to the comparison range.

The present invention also provides an apparatus for acquiring object image of a pointer. The apparatus is suitable for an optical touch system, and it is used for acquiring an object image of a pointer when the pointer interacts with a touch surface of the optical touch system. The apparatus comprises an image sensor and a processing circuit. The image sensor is used for sensing an image of the touch surface. The processing circuit is electrically coupled to the image sensor. When the pointer approaches the touch surface, the processing circuit acquires an image information from a sensed image, and the processing circuit compares at least a part of the image information of the sensed image with a first threshold value, so as to determine a comparison range. The processing circuit further acquires a second threshold value according to the image information in the comparison range. And the processing circuit compares the image information in the comparison range with the second threshold value, so as to acquire an object image of the pointer, and the second threshold value is determined by the image information in the comparison range.

In an embodiment of the aforementioned apparatus, the said at least a part of the image information is a first brightness distribution profile acquired by the processing circuit, wherein the processing circuit acquires the brightness values of the N brightest pixels in each pixel column of the sensed image, and the processing circuit calculates an average brightness value or a total brightness value of the N brightest pixels in each pixel column to obtain the first brightness distribution profile, wherein N is a natural number.

In an embodiment of the aforementioned apparatus, the comparison range contains all column information with brightness values less than the first threshold value in the first brightness distribution profile.

In an embodiment of the aforementioned apparatus, the processing circuit acquires the first threshold value according to a first predetermined percentage of a second brightness distribution profile acquired from a background image. The background image is an image which is obtained in advance by the processing circuit before the pointer approaches the touch surface, and it does not contain any object image of the pointer. And the processing circuit also calculates an average brightness value or a total brightness value of the selected N brightest pixels in each pixel column of the background image, so as to obtain the second brightness distribution profile.

In an embodiment of the aforementioned apparatus, the processing circuit acquires the second threshold value according to a second predetermined percentage of the second brightness distribution profile.

In an embodiment of the aforementioned apparatus, the processing circuit selects the lowest dot from a curve segment corresponding to the comparison range in the first brightness distribution profile and adds a predetermined brightness value to the brightness value of the column pixel corresponding to the lowest dot, so as to acquire the second threshold value.

In an embodiment of the aforementioned apparatus, the object image of the pointer contains the image information having the brightness values lower than the second threshold value in the comparison range.

In the present invention, the optical touch system acquires object images of a plurality of the pointers through two different threshold values. In actual operation, the processing circuit acquires an approximate imaging range of the plurality of the pointers in the image sensing window of the image sensor through the first threshold value at first. The approximate imaging range is a comparison range needed to further be performed a comparison. Afterwards, the processing circuit acquires a second threshold value according to the image information in the comparison range, so as to further compare the image information in the comparison range with the second threshold value to acquire the object images of the plurality of the pointers. That is, the processing circuit acquires the actual imaging ranges of the plurality of the pointers through the aforementioned comparison related to the second threshold value. Thus, the processing circuit can further calculate the coordinates of the plurality of the pointers according to the actual imaging ranges.

Therefore, as long as the second threshold value is appropriate, the processing circuit can accurately acquire the object images of the plurality of the pointers and further calculate the actual coordinates of the plurality of the pointers.

For above and another objectives, features, and advantages of the present invention being better understood and legibly, accompanying embodiments together with the drawings are particularized.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

With reference of the drawings, an apparatus and a method for acquiring an object image of a pointer in accordance with an exemplary embodiment of present invention are described as follows.

Figure 1:
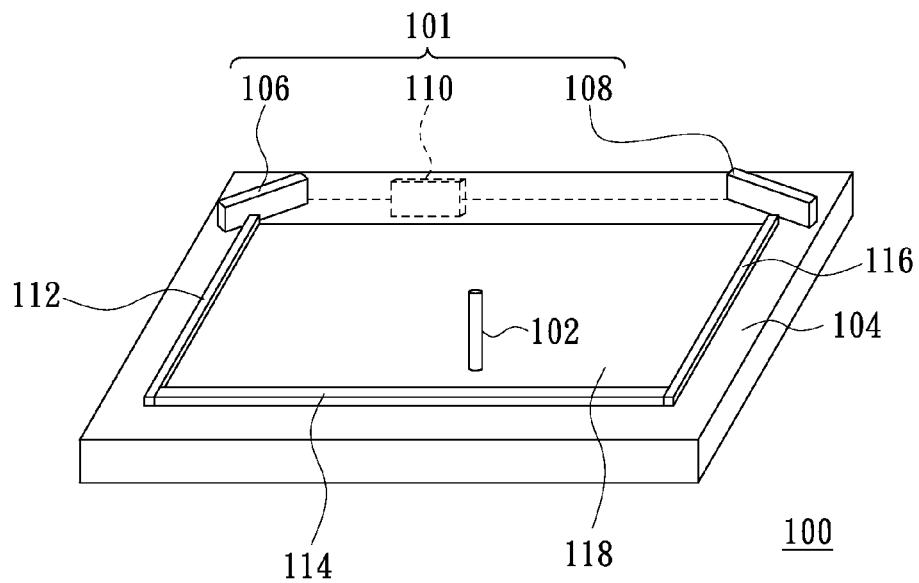
FIG. 1 is a perspective view of an optical touch system in prior art.
Figure 2:
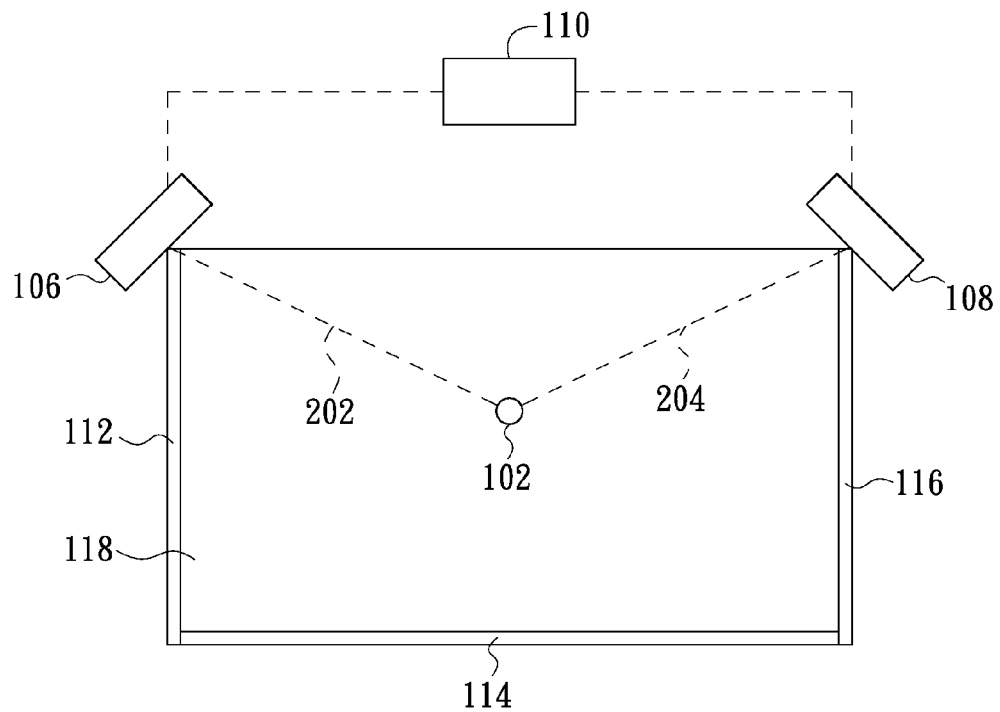
FIG. 2 is a schematic view of the optical touch system with single touch in prior art.
Figure 3:
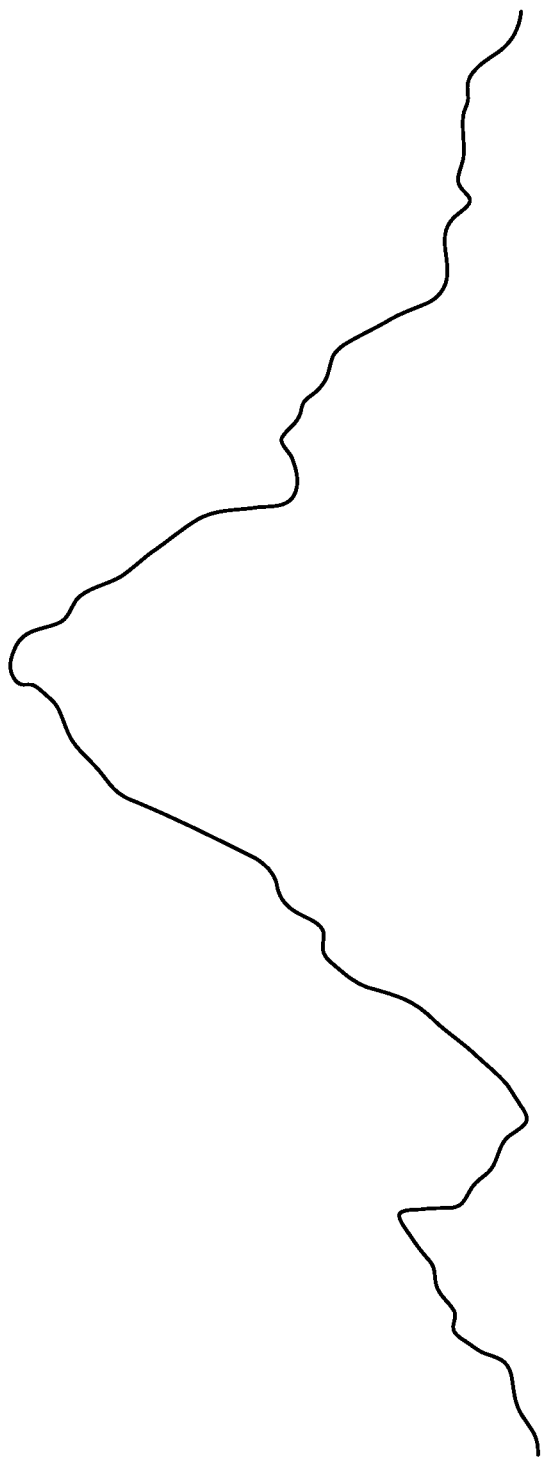
FIG. 3 shows an exemplary brightness distribution profile acquired from the background image in prior art.
Figure 4:
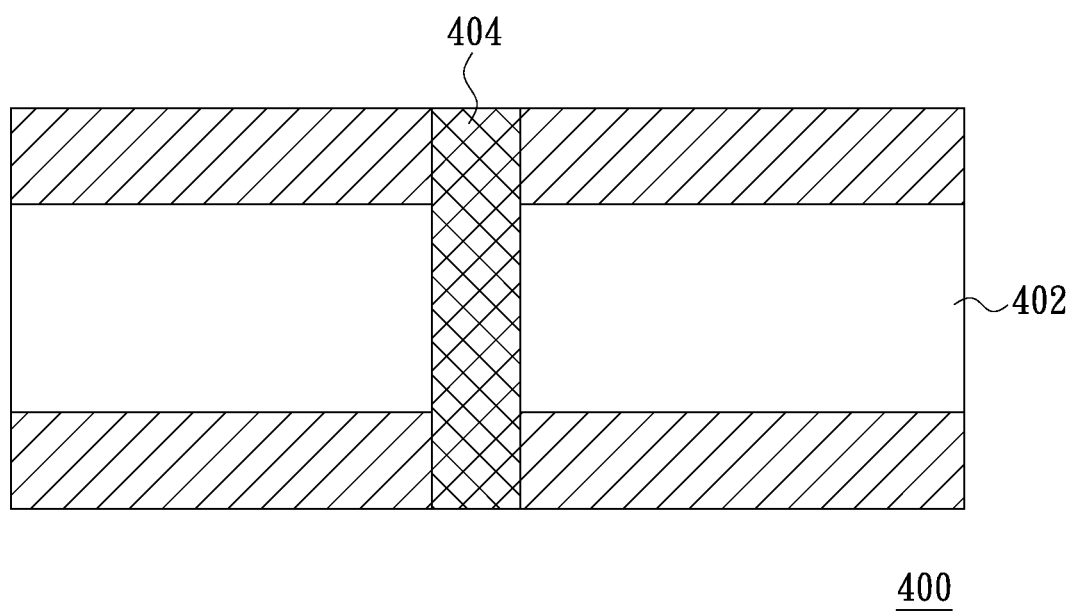
FIG. 4 is a schematic view of an image sensed by the image sensor in prior art.
Figure 5:
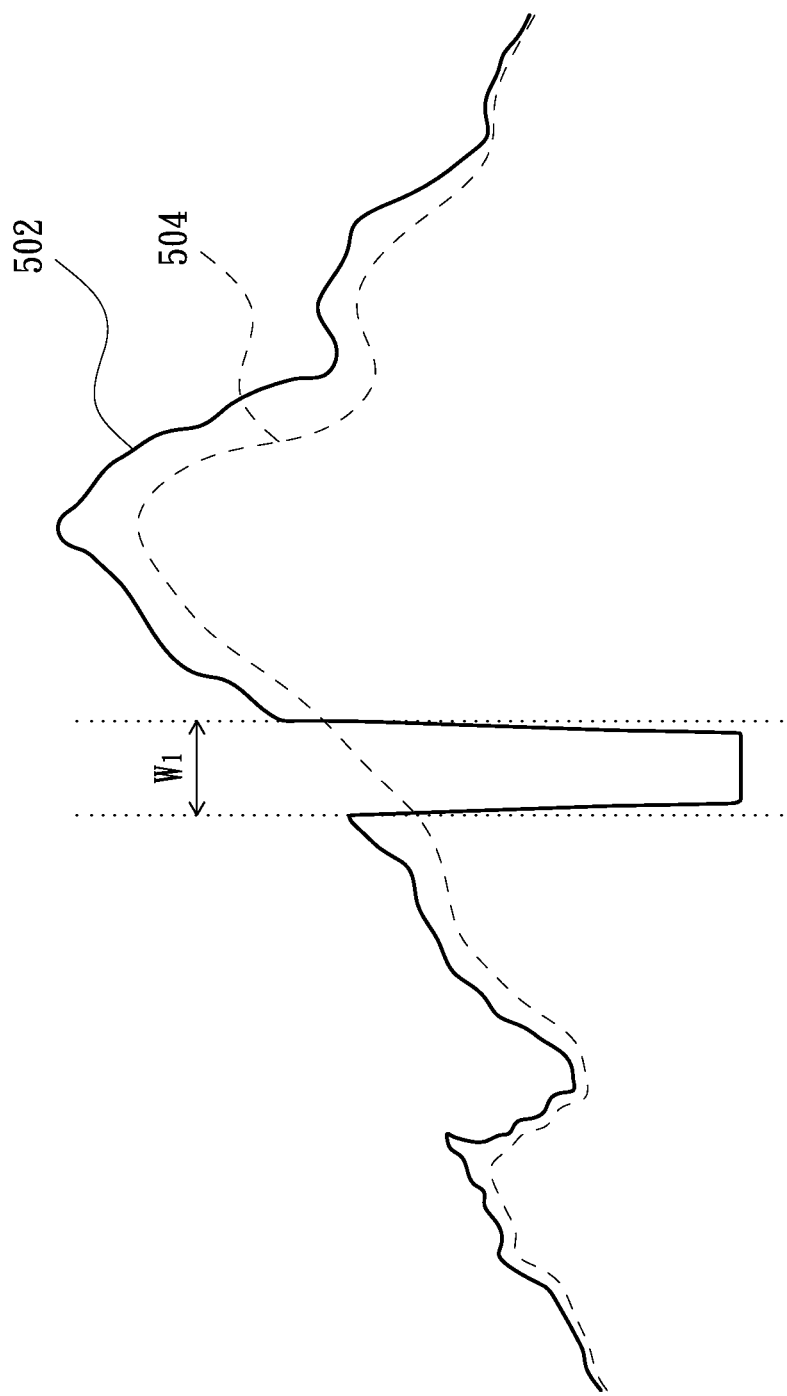
FIG. 5 shows another exemplary brightness distribution profile.
Figure 6:
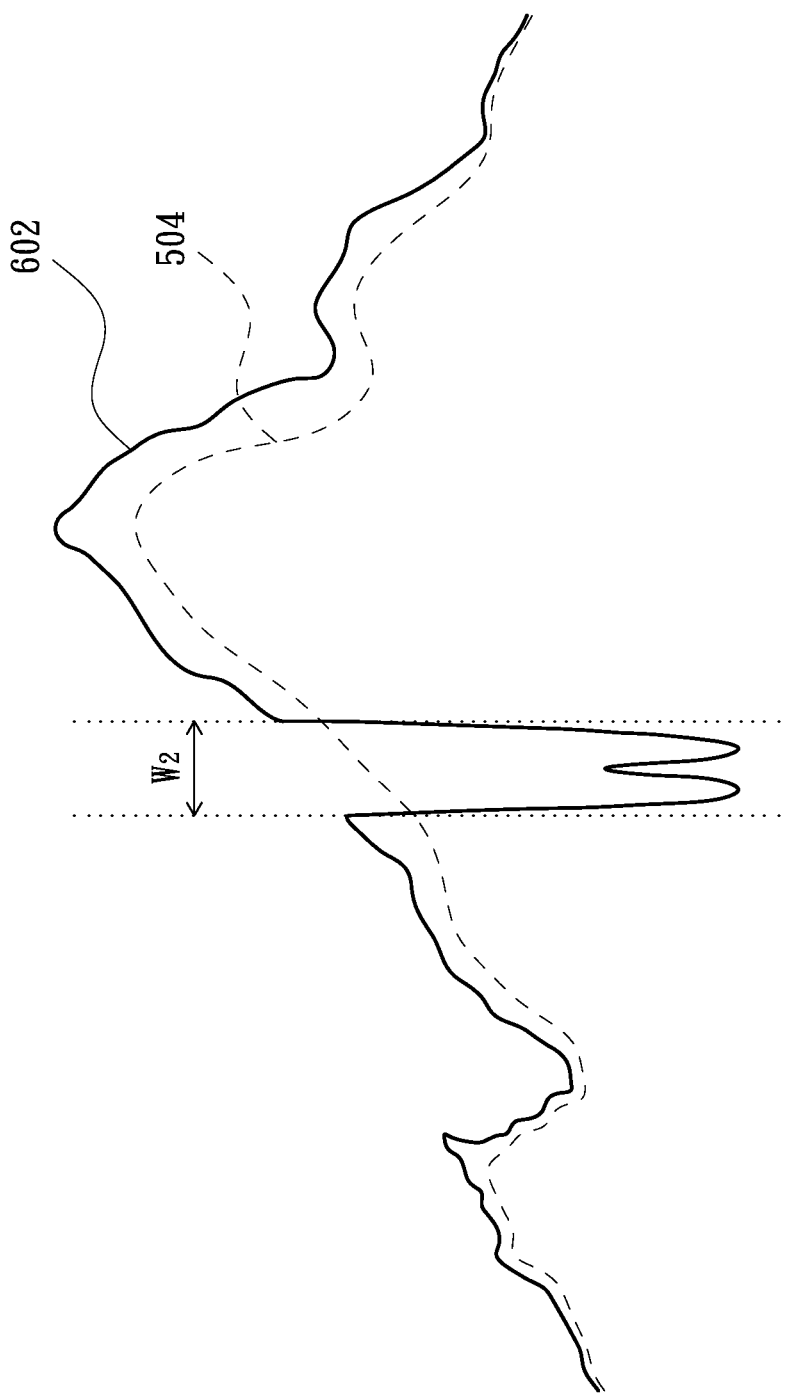
FIG. 6 shows an exemplary brightness distribution profile.

The structure of the optical touch system in this embodiment is the same with the structure of the optical touch system shown in FIG. 1, but the difference between the two optical touch systems is that the apparatus, used for acquiring the object image of a pointer, of the optical touch system in this embodiment operates in another manner. Therefore, the structure shown in FIG. 1 is referred to describe the operation of the optical touch system in this embodiment.

Referring to FIG. 1, the touch surface 118 has four boundaries (not labeled) connected in turn. The image sensors 106 and 108 are respectively configured in two different corners of the touch surface 118 and on the same side of the touch surface 118. Thus, the image sensors 106 and 108 can sense images of the touch surface 118 from two different orientations.

Next, a multi-touch process of the optical touch system in this embodiment is described as follows. Take an operation of the processing circuit 110 and the image sensor 106 as an example. When there is no pointer approaches the touch surface 118, the processing circuit 110 controls the image sensor 106 to sense the touch surface 118, so as to obtain an image which does not contain any object image of the pointer 102. And the processing circuit 106B further regards the obtained image as a background image. Afterwards, the processing circuit 110 acquires the brightness values of the N brightest pixels in each pixel column of the background image and calculates an average brightness value or a total brightness value of the N brightest pixels in each pixel column to acquire a brightness distribution profile, wherein N is a natural number.

Figure 7:
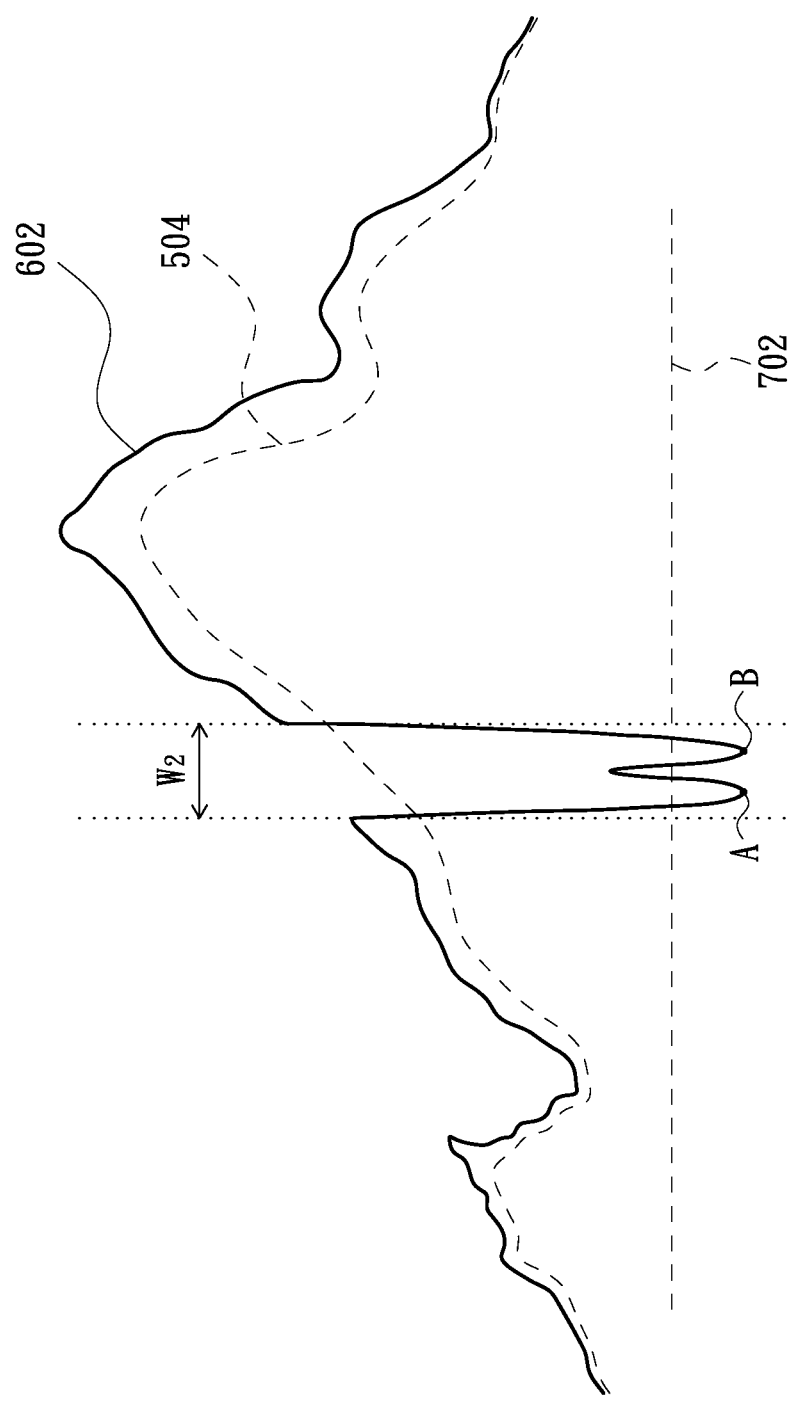
FIG. 7 shows another exemplary brightness distribution profile.

When there are two pointers 102 approaches the touch surface 118, and the two pointers 102 are adjacent to each other, the processing circuit 110 can acquire an image containing two object images of the two pointers 102 through the image sensor 106. Afterwards, the processing circuit 110 regards the image containing the two object images of the two pointers 102 as a sensed image. Certainly, the sensed image contains the brightness information of infra-red ray. Then, the processing circuit 110 compares at least a part of the information of the sensed image with a first threshold value, so as to acquire an approximate imaging range of the two pointers 102 in an image sensing window of the image sensor 106. The said approximate imaging range is a comparison range needed to further be performed a comparison (detailed as follows). In this embodiment, the said at least a part of the information is another brightness distribution profile acquired by the processing circuit. Wherein, the processing circuit 110 acquires the brightness values of the N brightest pixels in each pixel column of the sensed image and then acquires the said another brightness distribution profile by the same way of acquiring the aforementioned brightness distribution profile. And the processing circuit 110 acquires the said threshold value according to a predetermined percentage of the brightness distribution profile acquired from the background image. FIG. 7 shows the said another brightness distribution profile.

In FIG. 7, the curve segment labeled by 602 represents the brightness distribution profile acquired from the sensed image, and each dot of the curve segment represents a column pixel brightness value of the sensed image. The range labeled by $W_2$ is a range with low brightness formed by the light shading of the two pointers 102. The curve segment labeled by 504 represents the first threshold value. The meaning of the broken line labeled by 702 will be described later. From FIG. 7, the low brightness range labeled by $W_2$ is an approximate imaging range of the two pointers 102 in the image sensing window of the image sensor 106, and it is also a comparison range needed to further be performed a comparison. The comparison range contains all the column information with brightness values less than the first threshold value in the brightness distribution profile acquired from the sensed image. In other words, the processing circuit 110 compares the brightness distribution profile 602 and the first threshold value 504, so as to determine a column pixel distribution range corresponding to the part (in the range labeled by $W_2$) whose brightness values are less than the first threshold value 504 in the brightness distribution profile 602 and regard the determined column pixel distribution range as a first imaging range of the two pointers 102 in the image sensing window 400 of the image sensor 106. The first imaging range is the approximate imaging range of the two pointers 102.

Referring to FIG. 7, after the comparison range is acquired, the processing circuit 110 acquires a second threshold value according to the image information in the comparison range, so as to compare the image information in the comparison range and the second threshold value to obtain the actual imaging ranges of the pointers 102. The process of acquiring the second threshold value is further described as follows.

In this embodiment, the processing circuit 110 selects the lowest dot from the curve segment (in the range $W_2$) corresponding to the comparison range (i.e., the first imaging range) of the brightness distribution profile 602. Since both of the dots A and B are the lowest dots, the processing circuit 110 selects one of the two dots A and B stochastically. Afterwards, the processing circuit 110 defines a second threshold value between the first threshold value 504 and the corresponding brightness value of the lowest dot (i.e., dot A or dot B). In this embodiment, the processing circuit 110 regards the total brightness value of the column pixel corresponding to the lowest dot as a brightness standard value and adds a predetermined brightness value to the brightness standard value to acquire the second threshold value. The second threshold value is shown in FIG. 7, and it is labeled by 702.

After the second threshold value 702 is acquired, the processing circuit 110 compares the curve segment corresponding to the comparison range in the brightness distribution profile 602 with the second threshold value 702, so as to acquire the object image of the two pointers. In this embodiment, the processing circuit 110 regards a column pixel distribution range corresponding to the part with the brightness values less than the second threshold value 702 of the aforementioned curve segment as a second imaging range of the two pointers 102 in the image sensing window 400 of the image sensor 106. The second imaging range represents the actual imaging ranges of the two pointers 102. In other words, the processing circuit 110 acquires two curve segments lower than the second threshold value 702 from the brightness distribution profile 602 and further regards a column pixel distribution range corresponding to the two curve segments as the actual imaging ranges of the two pointers 102 in the image sensing window 400 of the image sensor 106. In brief, the processing circuit 110 acquires the image information having the brightness values lower than the second threshold value 702 from the comparison range and regards the acquired image information as the object images of the two pointers 102. Thus, the processing circuit 110 can further acquire the two straight line equations of the two sensing paths according to the actual imaging ranges of the two pointers 102.

Similarly, the operation of the processing circuit 110 and the image sensor 108 can be the same with the operation of the processing circuit 110 and the image sensor 106, so as to further acquire other two straight line equations of the two sensing paths. Thus, the processing circuit 110 can further calculate the coordinates of the two pointers 102 according to the four straight line equations. It can be learned from the above description that the optical touch system of the present invention still can accurately acquire the object images (i.e., the actual imaging ranges) of the two pointers and further calculate the actual coordinates of the two pointers 102 though the two pointers 102 are adjacent to each other. Therefore, the optical touch system of the present invention can accurately determine the coordinates of a plurality of the pointers in multi-touch mode.

In this embodiment, the processing circuit 110 acquires the second threshold value 702 (which is a straight line) by adding a predetermined brightness value to a total brightness value of the column pixel corresponding to the lowest dot A or B. Besides, the processing circuit 110 can also acquire another threshold value (which is a curve) according to another predetermined percentage of the brightness distribution profile acquired from the background image, so as to replace the second threshold value 702 by the said another threshold value.

Certainly, the said another threshold value used to replace the second threshold value 702 is between the lowest dot A (or B) and the first threshold value 504. In addition, the processing circuit 110 can also regard the lowest brightness value in the comparison range of the brightness distribution profile acquired from the sensed image as the second threshold value. Furthermore, after acquiring a brightness distribution profile by calculating the brightness value of each column pixel of the background image, the processing circuit 110 can further record the acquired brightness distribution profile to avoid the continual process of obtaining the brightness distribution profile. Moreover, the processing circuit 110 can also acquire the background image through one image sensor and then acquire the sensed image through the other image sensor.

From the above description, one skilled in the art can learn that the apparatus 101 still can process the acquirement of the object image of the pointers and can accurately acquire the object image of each of a plurality of pointers when the apparatus 101 only adopts one image sensor and one processing circuit. It needs to be pointed that the reflectors can be made by a retro-reflective material to achieve a better effect in this embodiment. In addition, each of the reflectors in this embodiment can be replaced with a lighting element as long as the lighting element radiates light towards the touch surface 118.

Figure 8:
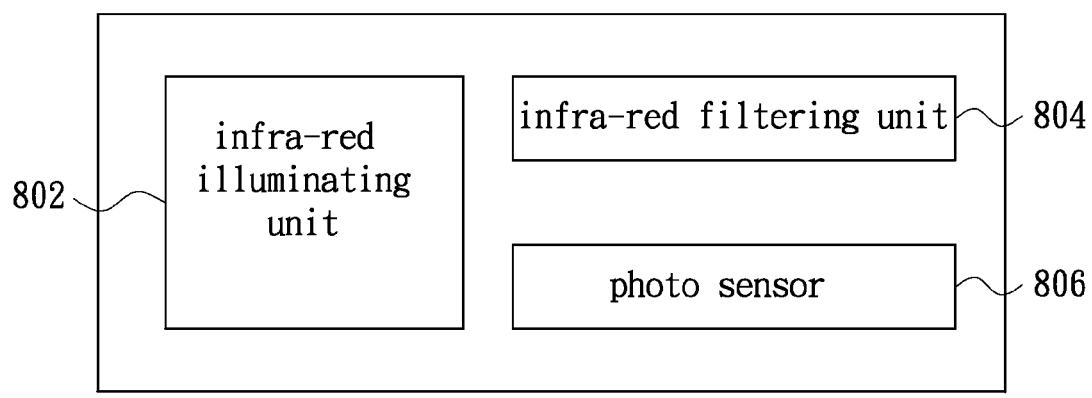
FIG. 8 shows an image sensor used for the optical touch system in the present invention.

FIG. 8 shows an image sensor used for the optical touch system in the present invention. Referring to FIG. 8, the image sensor 800 includes an infra-red (IR) illuminating unit 802, an infra-red filtering unit 804 which only allows infra-red ray to pass through and a photo sensor 806. The photo sensor 806 is used for obtaining an image of the touch surface 118 through the infra-red filtering unit 804. The photo sensor 806 is electronically coupled to the processing circuit 110. In addition, the infra-red illuminating unit 802 can be implemented by an IR light-emitting diode (IR LED), and the infra-red filtering unit 804 can be implemented by an IR-pass filter.

Figure 9:
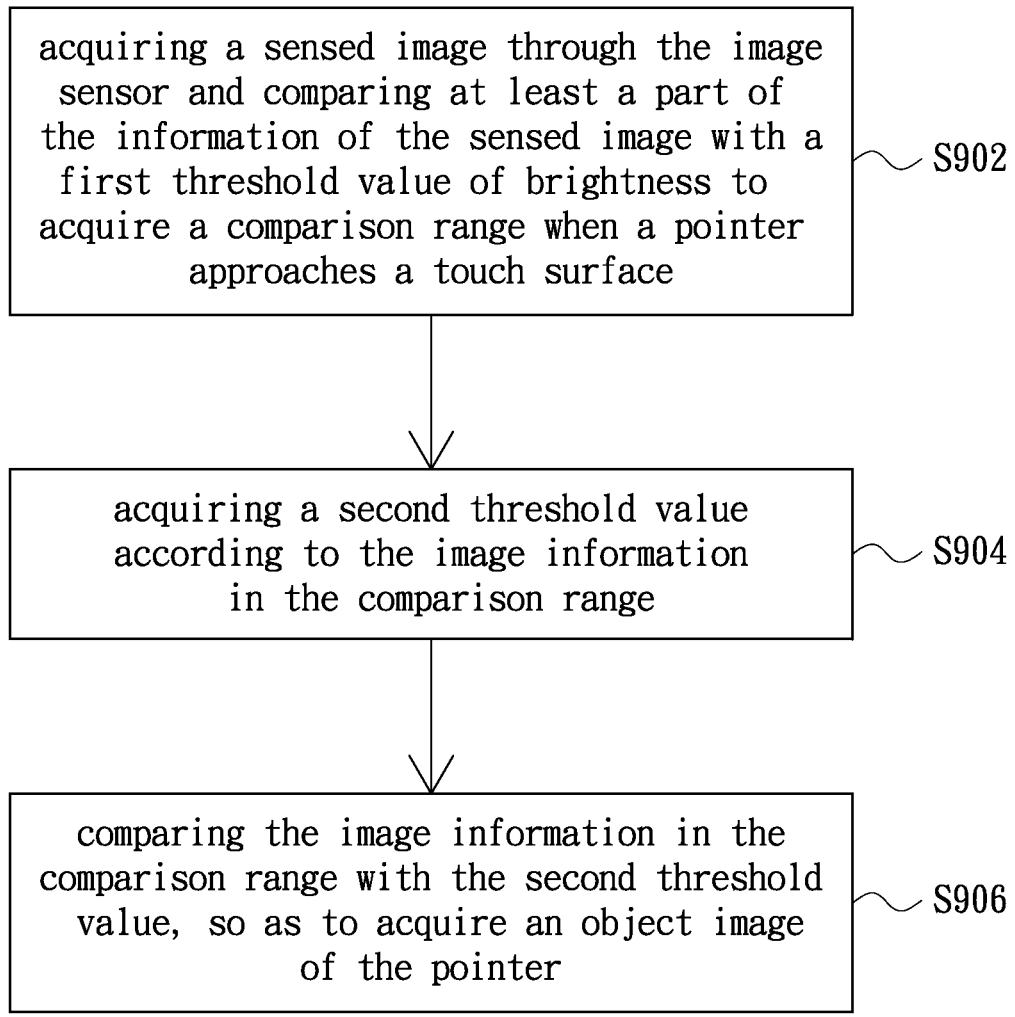
FIG. 9 is a flow chart of the method for acquiring an object image of a pointer according to an embodiment of the present invention.

From the above embodiments, a method of acquiring an object image of an object is concluded as shown in FIG. 9. FIG. 9 is a flow chart of the method for acquiring an object image of a pointer according to an embodiment of the present invention. The method is used for an optical touch system. The optical touch system includes a touch surface and image sensor. The image sensor is used for sensing an image of the touch surface. The method includes the following steps: acquiring a sensed image through the image sensor and comparing at least a part of the information of the sensed image with a first threshold value of brightness to acquire a comparison range when a pointer approaches a touch surface (shown in step S902); acquiring a second threshold value according to the image information in the comparison range (shown in step S904); and comparing the image information in the comparison range with the second threshold value, so as to acquire an object image of the pointer (shown in step S906).

As stated above, in the present invention, the optical touch system acquires object images of a plurality of the pointers through two different threshold values. In actual operation, the processing circuit acquires an approximate imaging range of the plurality of the pointers in the image sensing window of the image sensor through the first threshold value at first. The approximate imaging range is a comparison range needed to further be performed a comparison. Afterwards, the processing circuit acquires a second threshold value according to the image information in the comparison range, so as to further compare the image information in the comparison range with the second threshold value to acquire the object images of the plurality of the pointers. That is, the processing circuit acquires the actual imaging ranges of the plurality of the pointers through the aforementioned comparison related to the second threshold value. Thus, the processing circuit can further calculate the coordinates of the plurality of the pointers according to the actual imaging ranges.

Therefore, as long as the second threshold value is appropriate, the processing circuit can accurately acquire the object images of the plurality of the pointers and further calculate the actual coordinates of the plurality of the pointers.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus for acquiring object image of a pointer, the apparatus being suitable for an optical touch system and being used for acquiring an object image of a pointer when the pointer interacts with a touch surface of the optical touch system, the apparatus comprising:
   an image sensor used for sensing an image of the touch surface; and
   a processing circuit electrically coupled to the image sensor, wherein when the pointer approaches the touch surface, the processing circuit acquires an image information from a sensed image, and the processing circuit compares at least a part of the image information of the sensed image with a first threshold value, so as to determine a comparison range, the processing circuit further acquires a second threshold value according to the image information in the comparison range, and the processing circuit compares the image information in the comparison range with the second threshold value, so as to acquire an object image of the pointer;
   wherein the second threshold value is between the first threshold value and a lowest dot from a curve segment corresponding to the comparison range.

2. The apparatus as claimed in claim 1, wherein the said at least a part of the image information is a first brightness distribution profile acquired by the processing circuit, wherein the processing circuit acquires the brightness values of the N brightest pixels in each pixel column of the sensed image, and the processing circuit calculates an average brightness value or a total brightness value of the N brightest pixels in each pixel column to obtain the first brightness distribution profile, wherein N is a natural number.

3. The apparatus as claimed in claim 1, wherein the comparison range contains all column information with brightness values less than the first threshold value in the first brightness distribution profile.

4. The apparatus as claimed in claim 1, wherein the processing circuit acquires the first threshold value according to a first predetermined percentage of a second brightness distribution profile acquired from a background image, the background image is an image which is obtained in advance by the processing circuit before the pointer approaches the touch surface, and it does not contain any object image of the pointer, and the processing circuit also calculates an average brightness value or a total brightness value of the selected N brightest pixels in each pixel column of the background image, so as to obtain the second brightness distribution profile.

5. The apparatus as claimed in claim 3, wherein the processing circuit acquires the second threshold value according to a second predetermined percentage of the second brightness distribution profile.

6. The apparatus as claimed in claim 1, wherein the processing circuit selects the lowest dot from a curve segment corresponding to the comparison range in a first brightness distribution profile and adds a predetermined brightness value to a brightness value of a column pixel corresponding to the lowest dot, so as to acquire the second threshold value.

7. The apparatus as claimed in claim 1, wherein the object image of the pointer contains the image information having brightness values lower than the second threshold value in the comparison range.

8. The apparatus as claimed in claim 1, further comprising an infra-red illuminating unit and an infra-red filtering unit which only allows infra-red ray to pass through, wherein the image sensor acquires the image of the touch surface through the infra-red filtering unit.

9. An apparatus for acquiring object image of a pointer, the apparatus being suitable for an optical touch system and being used for acquiring an object image of a pointer when the pointer interacts with a touch surface of the optical touch system, the apparatus comprising:
   an image sensor used for sensing an image of the touch surface; and
   a processing circuit electrically coupled to the image sensor, wherein when the pointer approaches the touch surface, the processing circuit acquires an image information from a sensed image, and the processing circuit compares at least a part of the image information of the sensed image with a first threshold value, so as to determine a comparison range, the processing circuit further acquires a second threshold value according to the image information in the comparison range, and the processing circuit compares the image information in the comparison range with the second threshold value, so as to acquire an object image of the pointer, and the second threshold value is determined by the image information in the comparison range;
   wherein both of the first threshold value and the second threshold value are related to the image information of the same sensed image.

10. The apparatus as claimed in claim 9, wherein the said at least a part of the image information is a first brightness distribution profile acquired by the processing circuit, wherein the processing circuit acquires the brightness values of the N brightest pixels in each pixel column of the sensed image, and the processing circuit calculates an average brightness value or a total brightness value of the N brightest pixels in each pixel column to obtain the first brightness distribution profile, wherein N is a natural number.

11. The apparatus as claimed in claim 10, wherein the comparison range contains all column information with brightness values less than the first threshold value in the first brightness distribution profile.

12. The apparatus as claimed in claim 9, wherein the processing circuit acquires the first threshold value according to a first predetermined percentage of a second brightness distribution profile acquired from a background image, the background image is an image which is obtained in advance by the processing circuit before the pointer approaches the touch surface, and it does not contain any object image of the pointer, and the processing circuit also calculates an average brightness value or a total brightness value of the selected N brightest pixels in each pixel column of the background image, so as to obtain the second brightness distribution profile.

13. The apparatus as claimed in claim 12, wherein the processing circuit acquires the second threshold value according to a second predetermined percentage of the second brightness distribution profile.

14. The apparatus as claimed in claim 9, wherein the processing circuit selects a lowest dot from a curve segment corresponding to the comparison range in a first brightness distribution profile and adds a predetermined brightness value to a brightness value of a column pixel corresponding to the lowest dot, so as to acquire the second threshold value.

15. The apparatus as claimed in claim 9, wherein the object image of the pointer contains the image information having brightness values lower than the second threshold value in the comparison range.

16. The apparatus as claimed in claim 9, further comprising an infra-red illuminating unit and an infra-red filtering unit which only allows infra-red ray to pass through, wherein the image sensor acquires the image of the touch surface through the infra-red filtering unit.

\* \* \* \* \*